Patented Jan. 24, 1950

2,495,306

UNITED STATES PATENT OFFICE 2,495,306

HEAT-RESISTANT PAINT CONTAINING METHYL SILICONE RESIN, BORIC ACID, AND A LEAD COMPOUND

Paul Zurcher, Ponca City, Okla.

No Drawing. Application May 10, 1946,
Serial No. 668,757

7 Claims. (Cl. 260—18)

This invention relates as indicated to paints and more particularly to heat-resistant paints which are capable of withstanding temperatures up to 450° C. to 650° C.; remain unaffected by rapid temperature changes; are weather-proof; and dry similarly to a normal paint.

It is a principal object of my invention to provide a paint having the foregoing properties.

Other objects of the invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated this invention comprises a heat-resistant paint composition characterized by the inclusion therein of the following components:

(a) An acidic compound of boron such as boric acid;

(b) A lead compound such as lead oxide capable of reacting with the acidic compound of boron at an elevated temperature to form a lead borate; and (c) A silicone polymer.

The term "acidic compound of boron" is used to describe the first component since any of the boric acids available may be used, i. e. $H_3BO_3$, $H_2B_4O_7$, and $HBO_2$. $H_3BO_3$ is preferred.

The second component of the composition, i. e. a compound of lead capable of reacting with the acidic compound of boron at a high temperature to form a lead borate may be any of the well-known lead oxides, lead carbonate, basic lead carbonate, and similar inorganic and organic compounds capable of reacting with boric acid at an elevated temperature.

The third component of my composition may be generically defined as a silicone polymer. The preparation of these silicone polymers is described in a number of issued patents, of which Nos. 2,258,218; 2,258,219; 2,258,220; 2,258,221; and 2,258,222 are representative. These silicone polymers are available on the market as commercial products and since their composition and mode of manufacture forms no part of the present invention, it is believed unnecessary to more particularly refer to them or their composition.

I am aware that it has been proposed to prepare heat-resistant paints employing these polymeric silicones as the vehicle. Such paints afford excellent protection to metal surfaces in some cases up to 300° C. and when not exposed to any higher temperatures are water-proof and last for relatively long periods of time. When, however, such paints are heated to higher temperatures on the order of from 400° C. to 650° C. they crack, peel and disintegrate into a loose dust.

As a consequence, a steel surface coated with a silicone paint is oxidized after a few hours of heating, first to spongy ferro-ferric oxide and finally to ferric oxide. At the same time any metal pigments in the film, such as aluminum and zinc are also oxidized.

These defects of silicone paints of the prior art are overcome by the use in conjunction therewith of the boric acid-lead compound mixture comprising components (a) and (b) above identified.

If the boric acid-lead compound mixture, which may or may not contain other pigments as coloring matter or extenders, is combined with a vehicle consisting wholly or partly of a silicone polymer varnish, the defects of the silicone varnish disappear. Such paints combine the high resistance to moisture and hardness of the silicones in the lower temperature range. When heated above 300° C., the film remains intact, no cracking or peeling or disintegration occurs. This may be due to the fact that the boric acid, the lead compound and the silicone combine to a lead borosilicate. The latter has the further advantage of greatly reducing the softening of the film at higher temperatures.

In the compositions of my invention it is not necessary that all of the lead compound or compounds present react with boric acid. It is frequently preferable to use just sufficient boric acid to produce an adherent film upon heating. Anywhere from 5 per cent to 30 per cent boric acid calculated on the total weight of the pigment may be used depending on the bulk of the pigment.

If a paint film is intended to be exposed over long periods of time to atmospheric conditions before heat is applied, I mix the silicone varnish solution with drying resin solutions, such as phenol-formaldehyde, alkyd or glyceryl-phthalic, urea-formaldehyde as well as varnishes made from linseed oil, tung oil, dehydrated castor oil, perilla oil, and natural or other synthetic resins, or one of the many variations or combinations of these varnishes. In case these varnishes cannot be readily dispersed in silicone solutions, I use some dispersion agents. Particularly effective are secondary aliphatic amines, such as dipropyl, dibutyl, diamyl, dioctyl amine or aromatic amines, such as aniline, toluidines, xylidines, naphthylamines, etc. Perfect dispersion is generally obtained by the addition of 1 per cent to 2 per cent by weight of one of these dispersion agents to the mixture of the silicone and resin solution.

Pigments found to be especially suitable to yield heat-resistant paints with the vehicles described are:

White:
| | Parts by weight |
|---|---|
| Basic lead carbonate | 30–50 |
| Boric acid | 5–20 |
| Titanium dioxide | 20–40 |
| Zinc oxide | 5–20 |

Gray:
| | |
|---|---|
| Blue lead | 40–90 |
| Boric acid | 5–20 |
| Zinc dust | 20–50 |
| Zinc chromate | 5–20 |

Light gray:
| | |
|---|---|
| Blue lead | 40–90 |
| Boric acid | 5–20 |
| Zinc dust | 5–25 |
| Zinc oxide | 5–15 |
| Zinc chromate | 5–20 |

Iron red:
| | |
|---|---|
| Red lead | 40–80 |
| Boric acid | 10–20 |
| Ferric oxide | 10–25 |

Red-brown:
| | |
|---|---|
| Blue lead | 40–60 |
| Boric acid | 5–20 |
| Ferric oxide | 5–15 |
| Zinc dust | 5–15 |
| Zinc chromate | 5–20 |

Yellow and green pigments of varying shades can be produced by replacing the titanium and zinc pigments in the formula for white with zinc chromate and with green chromium oxide. Extenders, such as kaolin, mica, magnesium, silicate, asbestos, silica, barium sulfate, etc., may be added to all the formulas cited above.

As vehicles I use pure silicone varnishes in concentrations of 5 per cent to 50 per cent, preferably 10 per cent to 30 per cent, or in combinations with solutions of other resins, such as phenol-formaldehyde in the ratios of 1 silicone to 1–5 phenol formaldehyde, phenol modified glyceryl-phthalic resins, glyceryl-phthalic and other polymerization products of polyhydric alcohols and polybasic acids as well as varnishes commonly used in the manufacture of paints. The amount of aromatic solvents may vary between 30 and 80 per cent by weight of the total vehicle.

*Example 1.*—A gray paint was composed of 75 per cent by weight of pigment and 25 per cent by weight of vehicle. The pigment consisted of blue lead 43 per cent, boric acid 10 per cent, zinc dust 42 per cent, zinc chromate 5 per cent; the vehicle consisted of 70 per cent glyceryl-phthalic resin, 10 per cent of another commercial brand of a silicone polymer, i. e., methyl polysiloxane resin, made available by the General Electric Company as their "General Electric 9980" silicone resin, and 20 per cent xylene. Two per cent by weight of the vehicle of aniline was added as a dispersion agent. This paint, thinned with 5 per cent xylene, was brushed on panels which were alternately heated and exposed to a small stream of water at the rate of 1,000 ml. a minute dropping from a height of 40 cm. The record shows:

| | Hours |
|---|---|
| Total watering time | 62¾ |
| Heated to 150° C | 17 |
| Heated to 300° C | 15 |
| Heated to 400° C | 4½ |
| Heated to 450° C | 36½ |
| Total time of test | 135¾ |

At the conclusion of the test the paint began to fail by oxidation of the zinc dust, no rust had appeared.

Four panels of the same paint were exposed to the atmosphere for 150 days, one unheated, the others heated for 24 hours to 150° C., 300° C., 450° C., respectively. None of the panels had developed any defects at the end of the test period.

*Example 2.*—A similar gray paint which differed from the one described in Example 1 in that the vehicle contained 20 per cent silicone resin instead of 10 per cent was treated by the above described accelerated test of heating and watering with variations in sequence of temperatures and time of heating. The average time elapsed to appearance of rust stain was 119 hours, varying between 88 and 164 hours in the single panels.

Comparison with paints containing a silicone resin in the vehicle without the combination of a lead compound and boric acid in the pigment was impossible. They all disintegrated upon heating to 300° C. or higher.

Other modes of applying the principle of the invention may be employed, change being made as regards the details described, provided the features stated in any of the following claims or the equivalent of such be employed.

I therefore particularly point out and distinctly claim as my invention:

1. A heat-resistant paint composition comprising:

| | Per cent |
|---|---|
| Boric acid | 5 to 50 |
| A lead compound capable of reacting with boric acid at an elevated temperature to form a lead borate selected from the group consisting of lead oxides and lead carbonates | 20 to 90 |
| Methyl silicone resin | 5 to 50 |

2. A heat-resistant paint composition comprising:

| | Per cent |
|---|---|
| Boric acid | 10 to 30 |
| A lead compound capable of reacting with boric acid at an elevated temperature to form a lead borate selected from the group consisting of lead oxides and lead carbonates | 20 to 50 |
| Methyl silicone resin | 5 to 20 |

3. A heat-resistant paint composition comprising:

| | Per cent |
|---|---|
| Boric acid | 10 to 30 |
| A lead compound capable of reacting with boric acid at an elevated temperature to form a lead borate selected from the group consisting of lead oxides and lead carbonates | 20 to 50 |
| Methyl silicone resin | 5 to 20 | together with such vehicles, pigments and extenders as are commonly used in paints.

4. A heat resistant paint comprising an admixture of boric acid and a lead compound capable of reacting therewith at an elevated temperature selected from the group consisting of lead oxides and lead carbonates, in a solution of a methyl silicone resin.

5. A heat resistant paint comprising an admixture of boric acid and a lead compound capable of reacting therewith at an elevated temperature selected from the group consisting of lead oxides and lead carbonates, in a drying oil solution containing at least 5% of a methyl silicone resin.

6. A heat-resistant paint composition comprising:

| | Per cent |
|---|---|
| Boric acid | 10 to 30 |
| A lead compound capable of reacting with boric acid at an elevated temperature to form a lead borate selected from the group consisting of lead oxides and lead carbonates | 20 to 50 |
| Methyl silicone resin | 5 to 20 |
| A dispersion agent | .01 to 20 |
| A solution containing a resin selected from the group consisting of phenol-formaldehyde, alkyd and urea-formaldehyde resins | 1 to 50 | together with such vehicles, pigments and extenders as are commonly used in paints.

7. A heat-resistant paint composition comprising:

| | Per cent |
|---|---|
| Boric acid | 10 to 30 |
| A lead compound capable of reacting with boric acid at an elevated temperature to form a lead borate selected from the group consisting of lead oxides and lead carbonates | 20 to 50 |
| Methyl silicone resin | 5 to 20 |
| An amine from the group consisting of aliphatic secondary amines and aromatic amines | .01 to 5 |
| A drying oil | 1 to 50 | together with such vehicles, pigments and extenders as are commonly used in paints.

PAUL ZURCHER.

REFERENCES CITED

The following references are of record in the file of this patent:

UNITED STATES PATENTS

| Number | Name | Date |
|---|---|---|
| 2,410,737 | Jenny | Nov. 5, 1946 |
| 2,442,613 | Nicodemus | June 1, 1948 |

OTHER REFERENCES

"Chemistry of the Silicones," by E. Rochow, Wiley and Sons (1946), p. 77.